United States Patent [19]
Fischer

[11] Patent Number: 4,770,827
[45] Date of Patent: Sep. 13, 1988

[54] PROCESS FOR PRODUCING MOLDED ARTICLES

[75] Inventor: Wolfgang Fischer, Mörlenbach, Fed. Rep. of Germany

[73] Assignee: Teroson GmbH, Fed. Rep. of Germany

[21] Appl. No.: 820,512

[22] Filed: Jan. 17, 1986

[30] Foreign Application Priority Data

Jan. 17, 1985 [DE] Fed. Rep. of Germany ....... 3501424

[51] Int. Cl.$^4$ .................. B29C 67/22; B29C 33/58
[52] U.S. Cl. ..................... 264/51; 264/338; 264/DIG. 65; 425/98; 425/817 R; 427/135; 427/422
[58] Field of Search ............. 264/41, 45.6, 309, 338, 264/DIG. 65, 51; 427/135, 422; 425/98, 817 R

[56] References Cited

U.S. PATENT DOCUMENTS

| | | | |
|---|---|---|---|
| 2,784,108 | 3/1957 | Cupper | 427/135 |
| 3,341,646 | 9/1967 | Britain | 264/338 X |
| 3,468,989 | 9/1969 | McMillan | 264/338 |
| 3,624,190 | 11/1971 | Cekada, Jr. et al. | 264/338 X |
| 3,625,727 | 12/1971 | Lightfoot et al. | 427/421 |
| 4,028,120 | 6/1977 | Emond | 427/135 |
| 4,244,912 | 1/1981 | Battice | 264/338 |
| 4,284,670 | 8/1981 | Kole | 427/422 |
| 4,312,672 | 1/1982 | Blahak et al. | 106/38 |
| 4,313,968 | 2/1982 | Sickles et al. | 427/422 |
| 4,399,088 | 8/1983 | Green | 264/54 |

FOREIGN PATENT DOCUMENTS 0018528 12/1980 European Pat. Off. .
2630846 9/1976 Fed. Rep. of Germany .
2620708 11/1976 Fed. Rep. of Germany .

OTHER PUBLICATIONS

*Hackh's Chemical Dictionary*, fourth edition, completely revised and edited by Julius Grant, New York, McGraw-Hill Book Co., ©1972, p. 422.
Arthur Weed, Metal Finishing, May 1959 (pp. 70–71).
European Pat. Office Search Report.

*Primary Examiner*—Philip Anderson
*Attorney, Agent, or Firm*—Bart G. Newland; William L. Baker

[57] ABSTRACT

A process for producing molded articles, especially molded polyurethane foam articles, wherein the mold is treated with an aqueous release agent or a concentrate of one or more release-active substances in organic solvent. The release agent is preheated, e.g. by an atomizer supplied with hot pressurized air, prior to being applied to the mold. The process enables the efficient use of water-base release agents and thus reduces the emission of harmful organic solvents into the atmosphere.

9 Claims, 1 Drawing Sheet

PROCESS FOR PRODUCING MOLDED ARTICLES

TECHNICAL FIELD

The present invention relates to a process for producing a molded article, especially a molded polyurethane foam article, by foaming in a mold. Prior to its filling with foam-producing components, the mold is pretreated with a preheated release agent, the release agent being either water-based or a viscous concentrate of release-active substances in a small amount of organic solvent.

BACKGROUND

The molding of polyurethane foam articles is well known. A wide variety of molding processes and foam-producing components are known to those skilled in the art. It is common practice to fill an open or closed mold with premixed polyol and isocyanate components through a feed channel. The exact nature of the foam-producing components depends upon the desired physical characteristics of the final product and whether working is to take place in accordance with a single stage (direct) process or a two-stage (prepolymer or semi-prepolymer) process. Such processes are described in detail in the literature and reference is made to "Integralschaumstoffe", Piechota and Rohr, 1975; Kunststoff - Handbuch, Volume VII, "Polyurethane", 1966; "Schaumkunststoffe", published by the Fachverband Schaumkunststoffe in GKV, 1976; and Wittfoht, Kunststoff - Technisches Worterbuch, part 3.

To permit easy and clean removal of polymerized foam articles from metal, wood or plastic molds, the mold surfaces which come into contact with the foam-producing components or the cured polyurethane foam are treated with release agents prior to filling the mold. To produce a uniform film on the mold surfaces, release agents are applied by known spraying and injection processes wherein the release agent is atomized either under the influence of a pressurized gas (e.g. air), or in an "airless" system wherein the release agent is pumped under high pressure through an atomizing nozzle. In addition to providing good mold release characteristics, the release agent often is called upon to influence the surface characteristics of the finished polyurethane foam article. In these cases, e.g. in the cold flexible mold field (seats, headrests and armrests of cars, etc.), certain additives produce the open-cell characteristics and consequently the required "breathability" of such foam articles.

Conventional release agents consist of organic solvents and release-active substances dissolved, dispersed, suspended or emulsified therein and which are normally considered "solids". As is well known, release agents can contain waxes, fats, silicone compounds, plasticizers, stabilizers, accelerators, etc. The solvents (such as methylene chloride, trichloroethane, perchloroethylene, petroleum and high-boiling petroleum hydrocarbons and refrigerants) serve as carriers, so that the release-active substances can be applied in a uniform film to the mold surfaces.

The particular release-active substances, amounts thereof and solvent(s) employed in a given release agent are chosen with respect to the mold temperature, the airing time (time between release agent application and prepolymer introduction) and the particular foam system (integral, rigid integral, cold flexible, etc.) employed. Thus, a wide variety of articles with widely varying characteristics are produced by those skilled in the art. Integral foam is used for producing automobile steering wheels where uniformity and good gripping characteristics are desired. When producing integral foam, the mold temperature is generally between 30° C. and 50° C. RIM process foam, which is frequently used for producing polished moldings, requires a mold temperature of about 50° C. to 70° C. and, consequently, a different release agent. Cold flexible foam articles, such as seats, headrests and armrests for cars, etc., are produced at mold temperatures in the range of 40° C. to 70° C. Mold temperature is generally 30° C. to 50° C. when producing a rigid foam articles, such as brackets for cars, window shutters, refrigerator components and furniture.

Upon introducing the release agent to the heated mold surface, the solvents evaporate as an azeotropic mixture. These solvents, together with the overspray, must be removed from the work area. Such removal operations result in the loss of valuable raw materials as well as the emission of pollutants which are highly prejudicial to the environment. Recycling processes via adsorption (to reduce harmful emissions) are conceivable, but would be greatly hindered by the "solid" release-active substances which are present in finely divided form.

As a result of the aforementioned problems, attempts have been made to use release agent concentrates with low solvent proportions, as well as release agents having an aqueous base, i.e., release agents in which organic solvents are largely and preferably totally replaced by water. The spraying of release agent concentrates is difficult because of the high viscosity of such concentrates. The use of aqueous release agents has proven problematical because the foam-producing components cannot be introduced into the mold until the solvent (water) has evaporated. The "airing times", or portions of the manufacturing cycle devoted to the evaporation of the release agent solvent, are in general between 20 and 60 seconds when an aqueous release agent is used. Such extended airing times unduly delay the manufacturing process and render the use of aqueous release agents uneconomical. Organic solvents allow the use of much shorter airing times, but such shortened times cause considerable problems when used in connection with aqueous release agents.

It is known that aqueous release agents have previously been used in a few fields (hot foam, modified integral foam in back-foaming processes). These aqueous release agents are wax dispersions or emulsions whose use has been subject to serious limitations regarding the surface characteristics of the foamed articles. Further, in the aforementioned foam production processes and at the mold temperatures used therein, considerable airing times are required so that the use thereof in industrial mass production is not economically feasible.

As previously mentioned, the incomplete evaporation of water from an aqueous release agent leads to lower quality foamed products. This is primarily due to a competing reaction, running parallel to the polyolisocyanate reaction, between water and isocyanate groups ($R-N=C=O + H_2O \rightarrow R-NH_2 + CO_2$), which liberates carbon dioxide and which partly displaces the precisely matched polyol: isocyanate ratio. This leads to foam problems, such as discolorations, bubbles, blisters and even partial foam collapse.

To avoid these disadvantages which result from the incomplete evaporation of aqueous release agents, release agents have been used which, in addition to water, contain considerable proportions of low boiling water soluble alcohols, ketones, esters, etc. as evaporation accelerators. Although these components lead to a certain reduction in the excessive evaporation times of aqueous release agents, such reduction is not sufficient to avoid the aforementioned reaction between the water and isocyanate. Moreover, and as stated earlier, these water soluble evaporation acclerators are very prejudicial to the environment. As a result of the aforementioned disadvantages, such aqueous release agents, which generally contain considerable solublizer proportions, have not been adopted in practice.

Accordingly, it is an object of the present invention to provide a process for producing polyurethane foam articles which permits the use of aqueous release agents, or release agent concentrates containing minor proportions of organic solvents, to thereby considerably reduce or avoid the prejudice to the environment linked to the use of organic solvents.

Another object of the present invention is to provide a process for producing polyurethane foam articles which obviates the disadvantages linked to the poor evaporation behavior of aqueous release agents and the high viscosity of release agent concentrates containing organic solvents.

These and other objects are achieved according to the present process wherein an aqueous release agent or a release agent concentrate containing relatively minor amounts of organic solvent is preheated prior to being applied to a mold in per se conventional manner, e.g. by atomization. The release agent is preheated in a variety of ways, such as by warming the liquid release agent before it reaches the atomizing nozzle and/or by atomizing the release agent with the aid of hot, pressurized gases, particularly hot compressed air.

As mentioned earlier, the present process is practiced by injecting or spraying a release agent into a mold, the release agent being atomized either under the influence of a compressed gas, such as compressed air, or via an "airless" system wherein the release agent is pumped at a high pressure through an atomizing nozzle. Particularly suitable for performing the present process are atomization units which combine the airless and compressed air principle. Such units include an external mixing head or sprayers wherein the atomization of the material takes place by pressure atomization and compressed air atomization.

In an atomization device, the nozzle shape, size, the material (release agent) pressure and the air pressure are chosen as a function of the viscosity of the agent to be sprayed. Guide values for the nozzle diameter are are 0.3 to 1 mm, for the material pressure 0.5 to 1 bar and for the aire pressure 2 to 4 bar, in order to be able to use release agents with viscosities between about 50 and 1,000 cps.

DETAILS

According to the present invention, the release agent is preheated prior to its application to the mold. The release agent may be preheated in a variety of methods. One suitable preheating method is carried out by atomizing the release agent with the aid of hot, pressurized gases, particularly hot compressed air. Another method for preheating the release agent is carried out by preheating the liquid release agent upstream of the atomization nozzle. The preheated liquid release agent may then be applied to a mold either via airless atomization or by atomization with preheated or unpreheated compressed gases, such as compressed air. Preheating the liquid release agent is accomplished by providing a heated supply line between a release agent reservoir an the atomization nozzle. In order to atomize the release agent with a hot compressed gas, it is necessary to provide the gas supply line with a heater. Injection or spraying means equipped with such a heater, however, have not yet been proposed.

The compressed air can be heated by means of heat exchangers or continuous flow heaters with appropriate capacity. The compressed air heaters should have the ability to continuously produce hot compressed air, preferably at a temperature of at least 80° C., more preferably at least 100° C., at a pressure of about 2-4 bar.

A particularly suitable apparatus for performing the present process, but for which protection is not claimed within the scope of the present application, is described in greater detail hereinafter in connection with the accompanying drawings, wherein:

Figure 2:
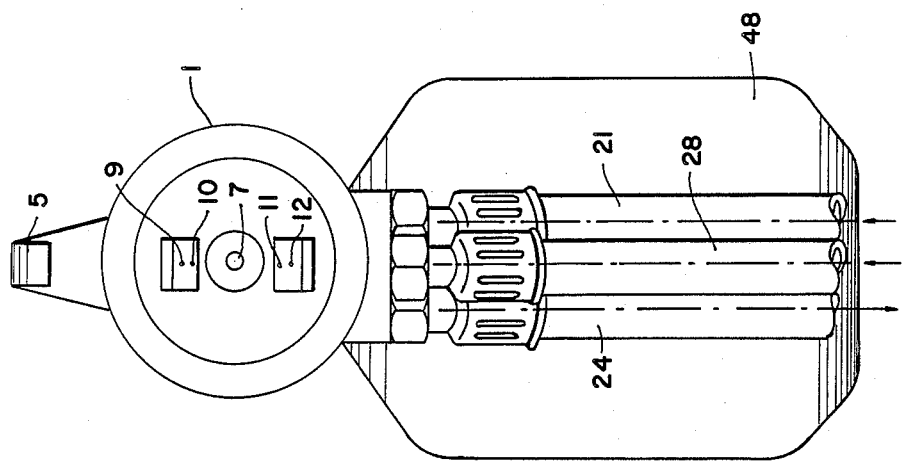
FIG. 2 is a front view of the apparatus of FIG. 1.
Figure 1:
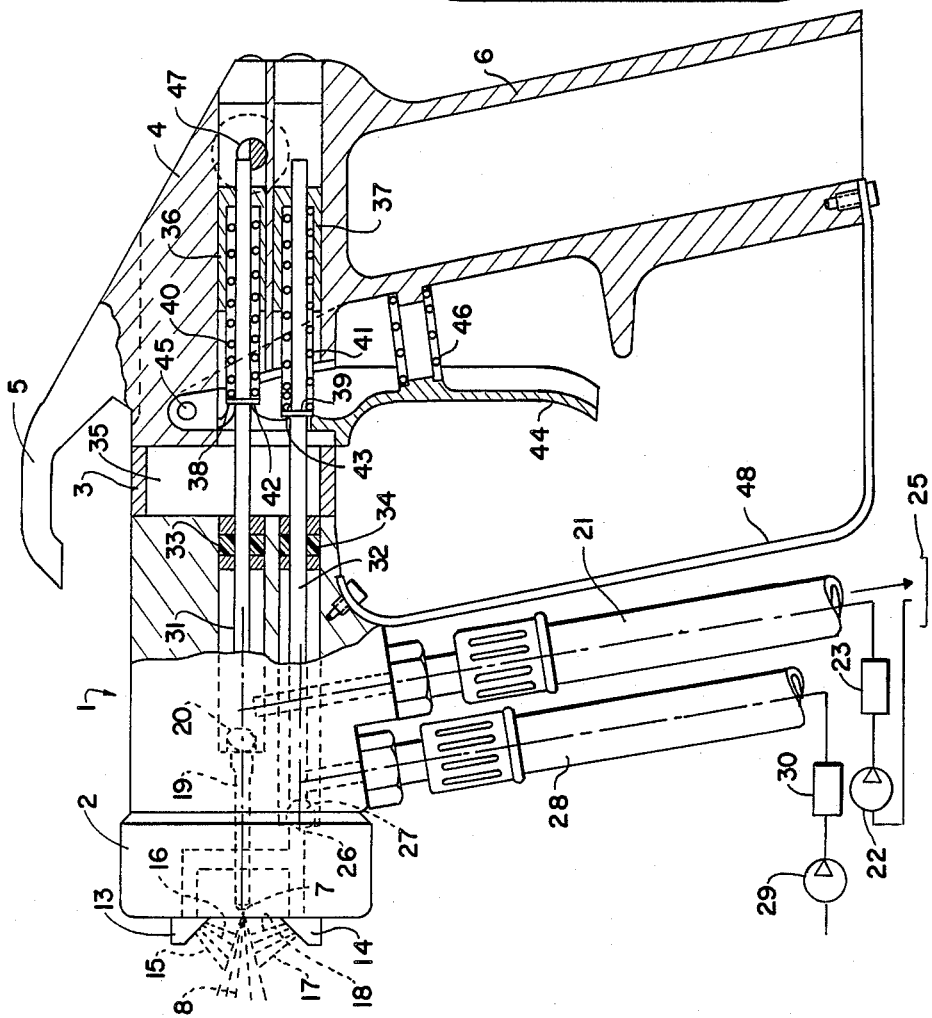
FIG. 1 depicts a spraying or injection device, partly in longitudinal section, partly in side view and partly diagrammatically.

The spraying or injection apparatus includes a gun 1 with a head 2 connected by means of a thermal insulating member 3 to a casing 4. The top of the casing 4 is provided with a hook 5 for suspending the gun, and a handle 6, disposed at the bottom of the casing 4, enables the gun to be held easily in the hand. Head 2 contains a central atomizing nozzle 7 which is able to hydrostatically supply a directed spray 8. Above and below the nozzle 7 are provided two slot-like gas outlets 9, 10 and 11, 12 in projecting members 13, 14 from which eminate gas mists 15, 16 and 17, 18 which meet the directed spray 8 directly following the atomization area and lead to the production of the directed spray.

The head contains an internal release agent supply line 19 which leads to the atomizing nozzle 7 and can be locked by means of a valve 20. This internal release agent supply line is connected via an external release agent supply line 21 to a pump 22 and a release agent heater 23. An internal return line (not shown) branches off from the internal supply line 19 in the vicinity of nozzle 7 and is connected to an external return line 24 which leads to a container 25 from which the release agent is drawn by means of the pump 22.

Gas outlets 9, 10, 11 and 12 are connected via an internal gas supply line 26 and a valve 27 to an external gas supply line 28 on the outer periphery of head 2. Gas is supplied to line 28 by a compressor 29 via a gas heater 30. Normally the gas used is air which is drawn from the environment and which is then heated. The issuing point of the external gas supply line 28 is located between the external release agent supply line 21 and the end face of head 2.

The two valves 20 and 27 are operated by valve operating rods 31, 32 which in each case pass through a packing 33, 34, extend through the inner area 35 of the thermal insulation member 3 and are guided in respective bushings 36, 37 at the rear end of the apparatus. Stops 38 39 fixed to the valve operating rods are held with the aid of springs 40, 41 against cams 42, 43 of a hand operating lever 44 which can be rotated about a pivot pin 45 held in casing 4 and secured in its left hand end position by a spring 46. The release agent valve operating rod 31 can be locked by a locking member 47 to secure the gun. Between the hand operating lever 44 and the external supply lines 21, 28 is located shield 48.

The two heaters 23, 30 preferably operate electrically and have setting or regulating means so as to impart a desired temperature to the release agent or gas pumping through the same. In particular, electric heating by PTC resistors can be used. However, it is also possible to use heaters of various other types, e.g. gas or oil heaters. Release agent heater 23 is optional and is used to slightly heat the release agent. The release agent must not be heated excessively, i.e. to a point where destruction of the release agent emulsion or dispersion occurs or where solvent loss occurs in the case of a release agent concentrate. However, the gas temperature can be much higher and as stated before is preferably at least 80° C. and can be even higher, e.g. 100° C. to 110° C.

If the hand operating lever 44 is drawn to the right, the gas valve 27 is opened and shortly afterwards the release agent valve 20 is opened. The directed spray 8 is then subject to the action of the hot gas from mists 15, 16, 17 and 18, so that heat is transferred from the gas to the spray droplets. Any excess temperature which could occur in the atomized droplets is of little consequence because the droplets are in the vicinity of the heated gas for small fractions of a second and their temperature rapidly drops, either through discharge expansion or through the drawing in of ambient air. However, it is important for the purposes of the present invention that the atomized droplets have undergone a heat treatment which, unlike in the prior art, insures that the droplets strike the surface to be coated at a high temperature and a low viscosity.

The arrangement of the external gas supply line 28 in the vicinity of the front of head 2 insures that the parts of the internal gas supply line 27 through which the hot gas flows are relatively short, so that the head 2 is heated as little as possible by the gas. Consequently, high temperatures are not transferred to the release agent by the head prior to atomization. To further avoid overheating, the release agent is in constant circulation via a supply line 21 and a return line 24.

Thermal insulation member 3 insures that the hot spray head 2 does not transmit excessive heat to the handle of the gun. Shield 48 protects the operator's hand from the radiation of heat by supply lines 21 and 28.

There are no limitations with respect to the aqueous release agents useable in the present process, i.e. they are present in the form of emulsions or dispersions and contain conventional release-active substances as "solids", which are incorporated into the aqueous base. The preparation of such release agents is carried out by conventional processes used in emulsion and dispersion technology (cf. e.g. Seifen-Ole-Fette-Wachse, Volume 107, Nov. 14, 1981, pages 391–402). Generally the water or at least part of the water is introduced beforehand, followed by the incorpoation of the various release-active substances, and optionally conventional addtives (e.g. accelerators, such as tin and amino accelerators), it being possible to use emulsifiers if necessary. The order in which the release-active substances are incorporated can be chosen at random. It is common to use elevated temperatures to facilitate emulsification. Any further discussion of the preparation or choice of release agents is deemed unnecessary as those of skill in the art are able to decide upon any particular release agent composition as a function of the particular requirements of the molding system employed.

EXAMPLE

An aluminum mold used for the production of polyurethane cold flexible foam articles was treated at a mold temperature of 53±2° C. with an aqueous organic solvent-free release emulsion, the time between the release agent application and the introduction of the foam-producing components being varied while maintaining constant the remaining parameters. The release agent was applied by a conventional spray gun with an external mixing head and operating on the basis of air atomization principles. The nozzle diameter was 0.33 mm, the air pressure 3.00 bar and the material pressure 1.00 bar. In order to produce hot compressed air, series-connected continuous flow heaters were employed, giving a continuous flow of hot compressed air at approximately 100° C. in the case of the aforementioned nozzle dimensions. The temperature of the air following expansion at the mixing head was approximately 40° C. as a result of the constriction effects.

The release agent consisted of 3.6% by weight of emulsifier-containing microwax with a melting range of 70° C. to 95° C., 0.4% by weight of fatty alcohol polyglycol ether mixture, 1.1% by weight of silicon glycols, 0.7% by weight of silicone stabilizers, 0.1% by weight of accelerators, 0.5% by weight of fluorinated polymers and 93.6% by weight of water. All of these constituents were conventional substances used in the formulation of mold release agents.

The surface characteristics of the foamed articles and their mold release characteristics were used as evaluating criteria. When using compressed air at a temperature of 20° C., an airing time of 45 seconds was adequate to obtain faultless foam articles. Mold release was good. However, on dropping below an airing time of 45 seconds, bubbles formed in the surface of the foam (particularly at the foam edges). At a 30 second airing time, these bubbles became large-area foam faults.

When using compressed air (according to the present invention) at a temperature of 100° C., faultless molded articles were obtained even at airing times of less than 10 seconds. Mold release was easier than in tests using compressed air at 20° C.

Although as a rule hot compressed air is preferred, these other heated, pressurized gases can offer advantages or may even be necessary in certain circumstances. Thus, when using flammable release agent concentrates, inert gases such as nitrogen or carbon dioxide can remove the risk of fire or explosion. However, it is to be assumed that in most cases hot compressed air will be used in view of its compatiblity with the desirable aqueous-based release agents and the high costs involved with the use of other gases.

I claim:
1. A process for producing a molded article, comprising:
   atomizing a release agent into a plurality of fine droplets by passing said agent through a nozzle means;
   warming said droplets, downstream of said nozzle means, with a hot, pressurized gas;
   directing said warmed droplets into a mold;
   introducing a moldable component into the mold; and molding said component.
2. A process of claim 1 wherein the release agent is preheated prior to said atomizing step.

3. A process of claim 1 wherein said release agent is atomized via an airless system.

4. A process of claim 1 wherein said release agent is atomized under the influence of a pressurized gas.

5. A process of claim 1 wherein said gas is air.

6. A process of claim 1 wherein said gas is heated to at least about 80° C.

7. A process of claim 1 wherein said gas is heated to at least about 80° C. and said mold is preheated to at least about 25° C.

8. A process of claim 1 wherein the release agent contains water as a solvent.

9. In process for a producing polyurethane foam article, in which the article is produced by foaming in a mold having been sprayed with an atomized release agent, the improvement therewith comprising heating the atomized spray of said release agent with a hot, pressurized gas, subsequent to atomization.

* * * * *